United States Patent
Zheng et al.

(10) Patent No.: US 10,663,122 B1
(45) Date of Patent: May 26, 2020

(54) LINE SOURCE SWEEPING LIGHT FIXTURE

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Zhaoyong Zheng, Zhejiang (CN); Huangfeng Pan, Zhejiang (CN)

(73) Assignee: Self Electronics Co., Ltd., Ningbo (CN)

(*) Notice: Subject to any disclaimer, the term of this patent is extended or adjusted under 35 U.S.C. 154(b) by 0 days.

(21) Appl. No.: 16/359,625

(22) Filed: Mar. 20, 2019

Related U.S. Application Data

(60) Provisional application No. 62/786,360, filed on Dec. 29, 2018.

(30) Foreign Application Priority Data

Jan. 11, 2019 (CN) .......................... 2019 1 0026278

(51) Int. Cl.
| | |
|---|---|
| *F21S 4/20* | (2016.01) |
| *F21V 15/01* | (2006.01) |
| *F21V 7/00* | (2006.01) |
| *F21V 7/10* | (2006.01) |
| *G02B 5/02* | (2006.01) |
| *G02B 27/09* | (2006.01) |
| *F21V 23/00* | (2015.01) |
| *F21Y 115/10* | (2016.01) |
| *F21Y 103/10* | (2016.01) |

(52) U.S. Cl.
CPC .............. *F21S 4/20* (2016.01); *F21V 7/0066* (2013.01); *F21V 7/10* (2013.01); *F21V 15/01* (2013.01); *F21V 23/005* (2013.01); *G02B 5/0278* (2013.01); *G02B 27/0955* (2013.01); *F21Y 2103/10* (2016.08); *F21Y 2115/10* (2016.08)

(58) Field of Classification Search
CPC .. F21S 4/20; F21V 7/0066; F21V 7/10; F21V 15/01; F21V 23/005; G02B 5/0278; G02B 27/0955; F21Y 2103/10; F21Y 2115/10
See application file for complete search history.

(56) References Cited

U.S. PATENT DOCUMENTS

| | | | | |
|---|---|---|---|---|
| 9,644,828 | B1* | 5/2017 | May | ........................ F21V 7/00 |
| 2010/0002435 | A1* | 1/2010 | Rash | ...................... B63B 45/02 |
| | | | | 362/235 |
| 2011/0286200 | A1* | 11/2011 | Iimura | .................... F21V 7/041 |
| | | | | 362/84 |
| 2012/0051058 | A1* | 3/2012 | Sharma | ................. F04B 43/046 |
| | | | | 362/294 |

(Continued)

*Primary Examiner* — Donald L Raleigh
(74) *Attorney, Agent, or Firm* — Wang Law Firm, Inc.

(57) ABSTRACT

A tubular lighting device encloses a plurality of LEDs and delivers light with uniformity, resembling the light delivered by a single linear light source. The tubular lighting device comprises a housing, a lighting chassis mounted on the housing, at least one circuit board with a plurality of LEDs mounted on the lighting chassis, each LED having a length A and two adjacent LEDs being separated by a distance L, a thin film mounted on the base and above the plurality of LEDs, the thin film being separated from the plurality of LEDs by a distance H, and a lens mounted on the lighting chassis and above the thin film.

11 Claims, 6 Drawing Sheets

(56) References Cited

U.S. PATENT DOCUMENTS

| | | | | |
|---|---|---|---|---|
| 2012/0294037 A1* | 11/2012 | Holman | ................... | F21V 5/02 |
| | | | | 362/609 |
| 2013/0094200 A1* | 4/2013 | Dellian | ................... | F21V 3/00 |
| | | | | 362/218 |
| 2014/0306612 A1* | 10/2014 | Woodgate | ........... | F21V 23/0471 |
| | | | | 315/153 |
| 2015/0233534 A1* | 8/2015 | Kaiser | ................... | G01J 1/0414 |
| | | | | 250/234 |
| 2016/0273748 A1* | 9/2016 | Salm | ...................... | F21V 21/30 |
| 2018/0087748 A1* | 3/2018 | Gladden | ................ | F21V 17/02 |

* cited by examiner

LINE SOURCE SWEEPING LIGHT FIXTURE

RELATED APPLICATION

The present application is a non-provisional of U.S. Provisional Patent Application 62/786,360, for Line Source Sweeping Light Fixture, filed on Dec. 29, 2018, the specification of which is incorporated herein by reference.

BACKGROUND OF THE INVENTION

1. Field of the Invention

The present invention generally relates to lighting technology, and more specifically, relates to lighting using LED as lighting source.

2. Description of the Related Art

The light emitting diode (LED) is becoming one of most common light sources and is used to replace many different light fixtures. When replacing traditional fluorescent light tubes, a plurality of LEDs are placed linearly on a circuit board mounted on a substrate. The physical arrangement of the LEDs resembles a fluorescent tube but the illumination effect is less than desired. The fluorescent tube emits light uniformly in all direction around the tube while the plurality of LEDs placed linearly on a circuit board emit directional light. The placement of the LEDs affects the illumination effect of these LEDs.

Furthermore, when the light from a light fixture with the plurality of LEDs is shone on a reflective surface, the individual light sources from the plurality of LEDs are readily noticed and cause a discomfort on human eye.

Therefore, there is a need for a light fixture using plurality of LEDs that provides a uniform light effect and it is to this improved light fixture the present invention is primarily directed to.

SUMMARY OF THE INVENTION

In one embodiment, the present invention is a tubular lighting device comprises a housing, a lighting chassis mounted on the housing, at least one circuit board with a plurality of LEDs mounted on the lighting chassis, each LED having a length A and two adjacent LEDs being separated by a distance L, a thin film mounted on the base and above the plurality of LEDs, the thin film being separated from the plurality of LEDs by a distance H, and a lens mounted on the lighting chassis and above the thin film. The light emitted from each LED passes through the thin film and forms an illumination cone, two adjacent illumination cones defines an overlapping cone, and the overlapping cone defines an overlapping angle θ. The relationship between the plurality of LEDs, the thin film, and the overlapping angle θ is defined by $$H \geq \tan\left(90 - \frac{\theta}{2}\right) * (0.9 + L - A)$$

The thin film preferably is an elliptical light diffusing film with a microstructure surface and the thin film can be either attached to the lens or separated from the lens. The housing comprises at least on side wall and at least one hook disposed away from the at least one side wall and the cover comprises at least one connecting skirt with a plurality of flanges; the connecting skirt is inserted between the at least one side wall and the hook.

The present system and methods are therefore advantageous as they enable identification of abnormal information access behaviors. Other advantages and features of the present invention will become apparent after review of the hereinafter set forth Brief Description of the Drawings, Detailed Description of the Invention, and the Claims.

BRIEF DESCRIPTION OF THE DRAWINGS

Features and advantages of embodiments of the invention will become apparent as the following detailed description proceeds, and upon reference to the drawings, where like numerals depict like elements, and in which.

DETAIL DESCRIPTION OF THE INVENTION

In this description, like numerals refer to like elements throughout the several views, and the articles "a" and "the" includes plural references, unless otherwise specified in the description. In the specification, "thin film" and "light diffusion film" are used interchangeably and "illumination cone" and "cone" are used interchangeably.

Figure 1:
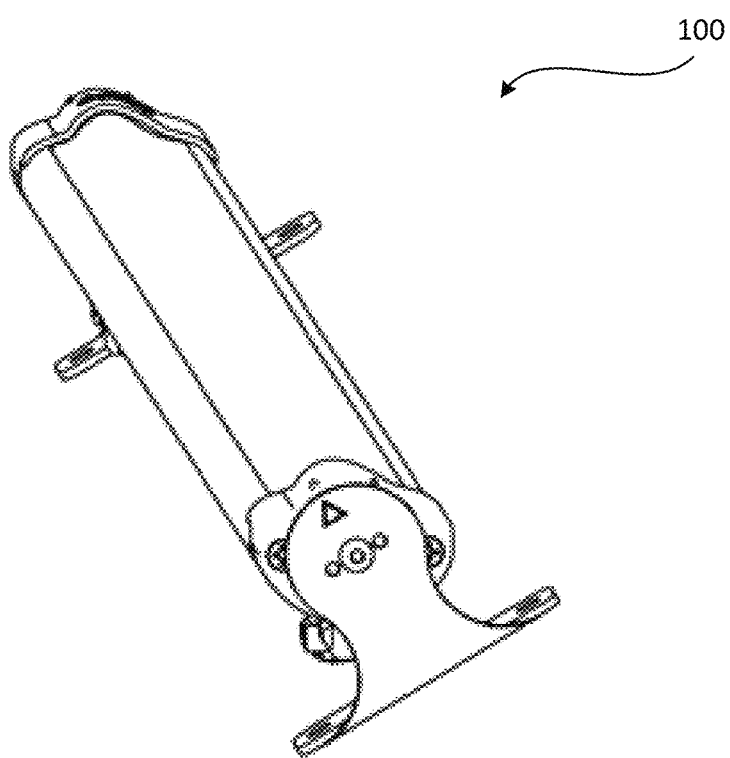
FIG. 1 depicts a tubular LED lighting fixture 100 of the present invention.
Figure 2:
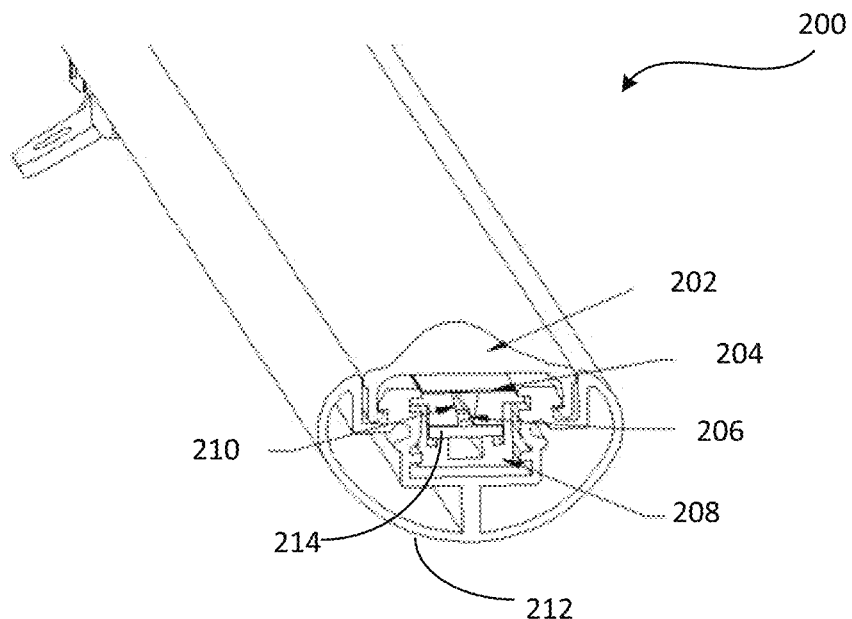
FIG. 2 is a cross section view 200 of the tubular LED lighting fixture 100.
Figure 7:
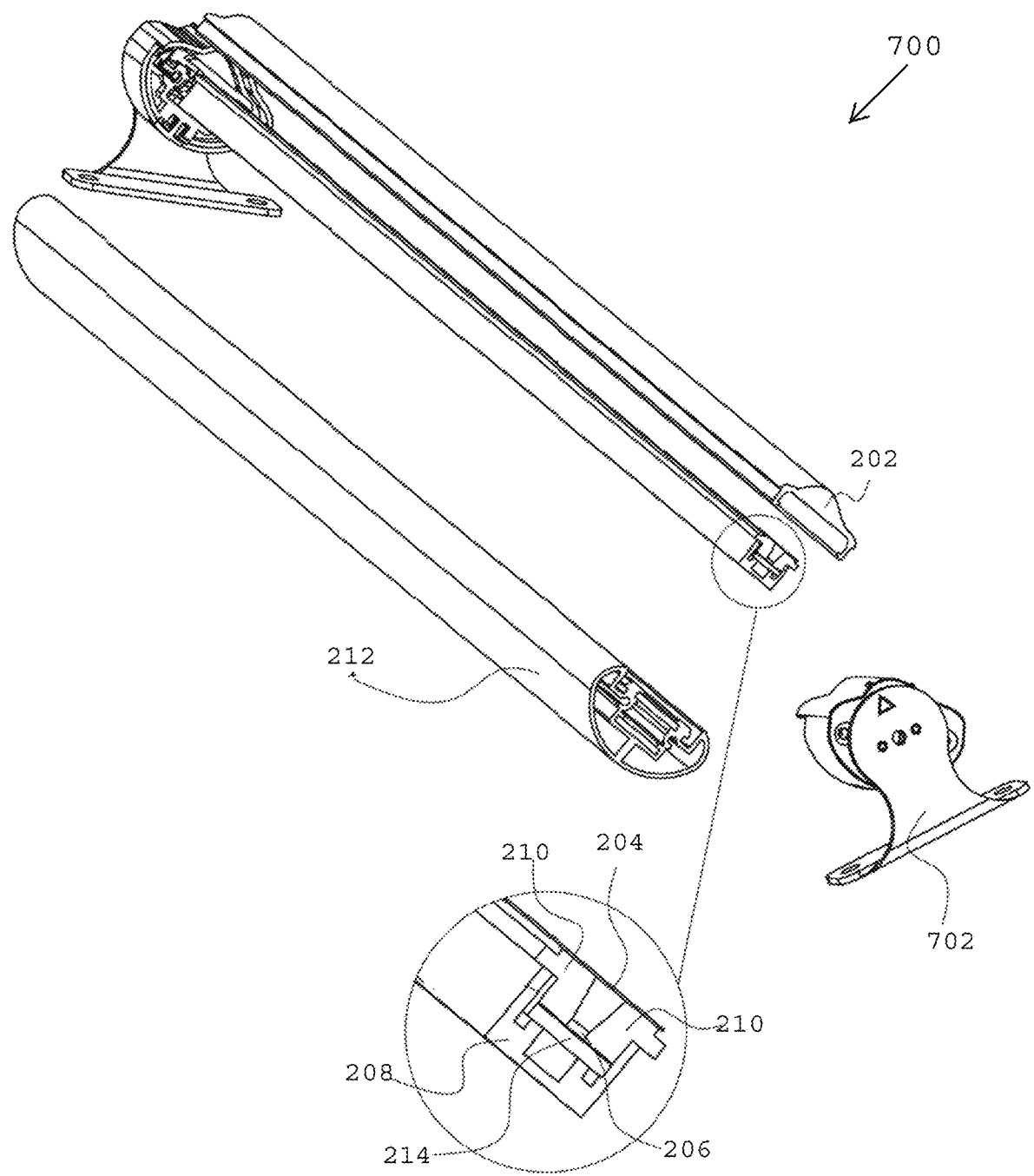
FIG. 7 is an exploded view of the tubular LED light fixture.

In an overview, the present invention enables a light fixture with a plurality of LED as light source to have a uniform lighting effect. FIG. 1 illustrates a tubular LED lighting device 100 that can be used as replacement to fluorescent tubes. FIG. 2 is a cross section view 200 of the tubular LED lighting device 100 and FIG. 7 is an exploded view of the same tubular LED lighting device 100. The tubular LED lighting device 100 has a housing 212, a light chassis 208 mounted on the housing 212, a circuit board 214 with a plurality of LEDs 206 mounted on the light chassis 208 along the length of the tubular LED lighting device 100, reflector surfaces 210 placed on both side of the LEDs and along the length of the tubular LED lighting device 100, a thin film 204 (aka light diffusion film) placed above the plurality of LEDs, and an asymmetric lens 202. The light emitted from the plurality of LEDs passes through the thin film 204 and the asymmetric 202 is uniform and without the appearance of being shone from a plurality of discreet light sources.

Figure 3:
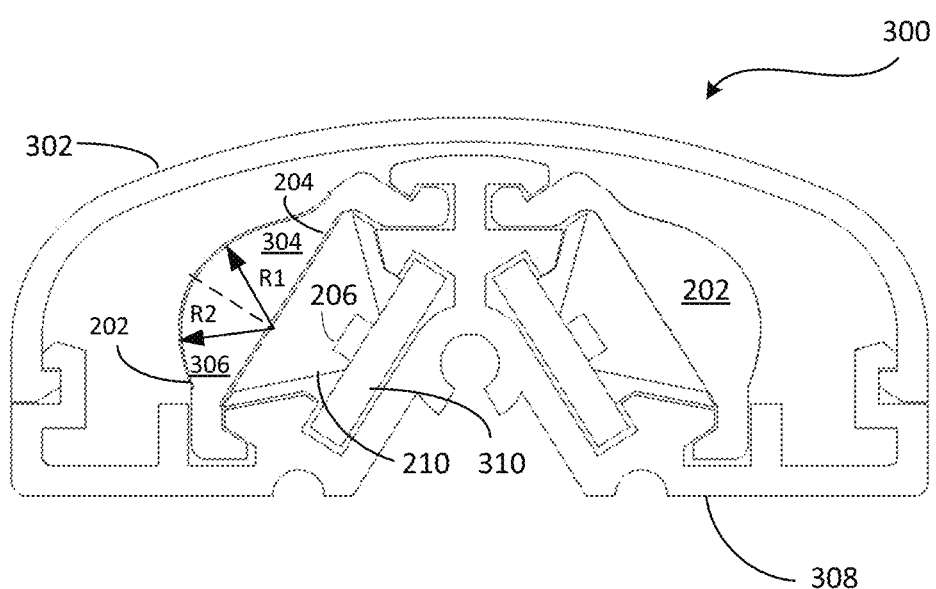
FIG. 3 is a schematic view 300 of the components inside the tubular LED lighting fixture according to an alternative embodiment.

FIG. 3 illustrates an alternative embodiment 300 of a tubular LED lighting device 200, in which there are two sets of LEDs placed under a cover 302 and these two sets of LEDs face away from each other. In this embodiment, the plurality of LEDs 206 on the circuit board 310 is mounted on the lighting chassis 308. The thin film 204 is attached to the asymmetric lens 202 and placed above the LEDs 206. In the asymmetric lens 202, the lens can be divided into two parts 304, 306, each part has a unique radius R1, R2, different from each other. The effect of the asymmetric lens is to spread the light more evenly on to the cover 302. The reflector surfaces 210 may be mounted around the plurality of LEDs 206. In an alternative embodiment, the reflector surfaces 210 may be mounted on the circuit board 310; the circuit board 310, the plurality of LEDs 206, and the reflector surfaces 210 form one single unit that slides into the lighting chassis 308. The space between the thin film 204, the LED 206, and the reflectors 210 is considered to be the reflecting cavity.

Figure 4:
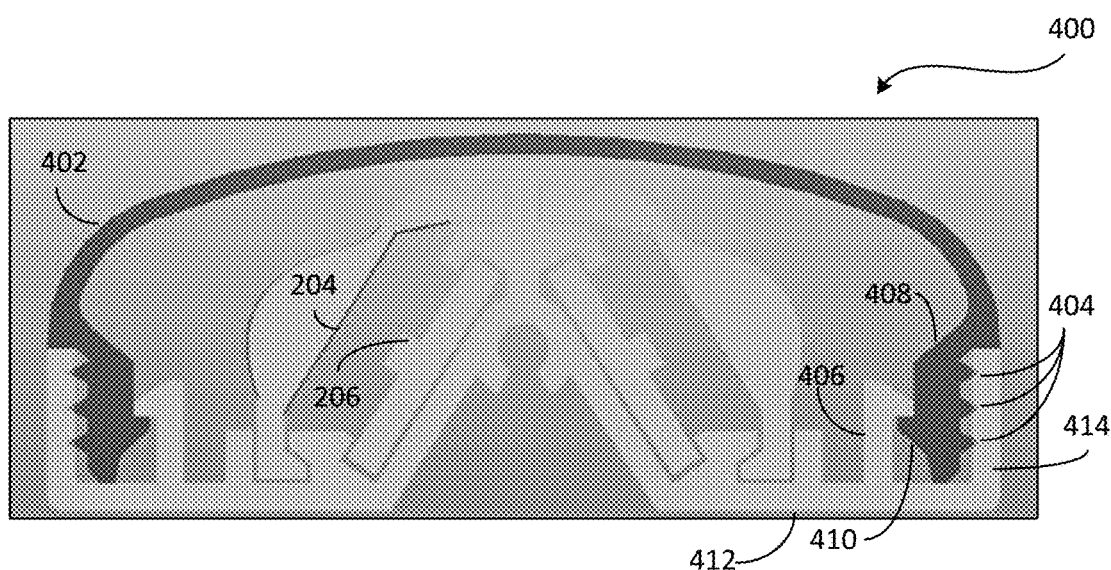
FIG. 4 is an alternative schematic view 400 of the tubular LED lighting fixture.

FIG. 4 is an alternative embodiment 400 of a tubular LED lighting device. In the embodiment 400, the light from the plurality of LEDs 206 is shone directly on to the thin film 204. The cover 402 is mounted on the lighting chassis 412 through a clip 410 on the cover 402 and a hook 406 on the lighting chassis 408. There is also a plurality of flanges 404 on the connecting skirts 408 the cover 402 that engages to a side wall 414 of the lighting chassis 412. The engagement of the connecting skirts 408 and the plurality of flanges 404 with the side wall 414 ensure tightness of the enclosure and prevents penetration of dust.

Figure 5:
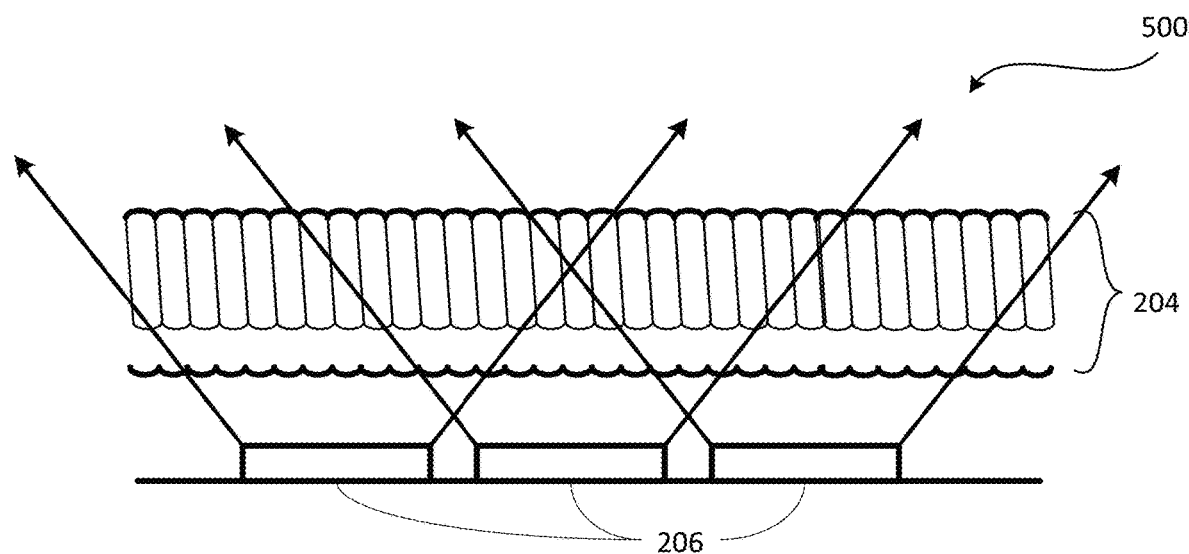
FIG. 5 is an illustration 500 of illumination of LEDs through a thin film.
Figure 8:
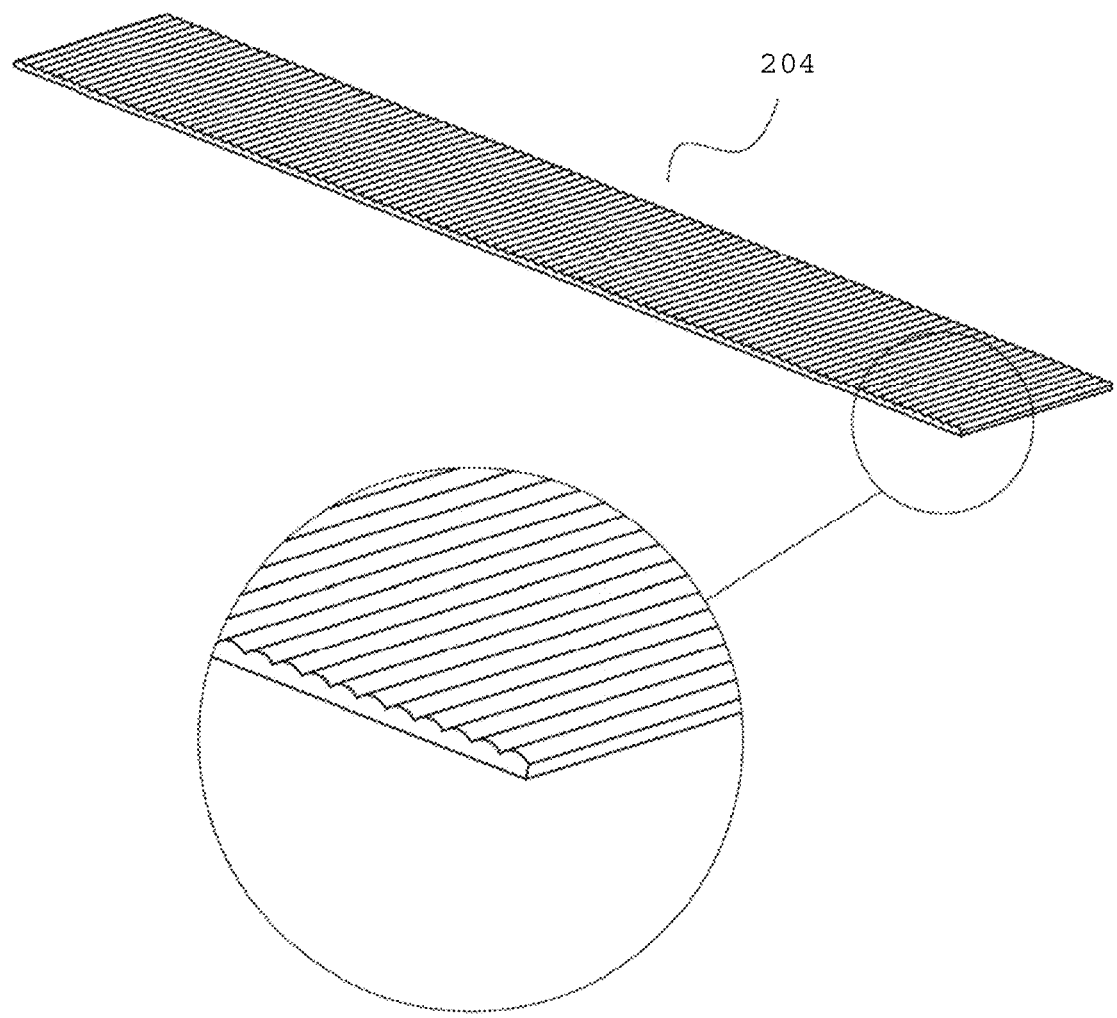
FIG. 8 is a detail view of a thin film.

FIG. 5 is an illustration 500 showing the illumination by the plurality of LEDs 206 through the thin film 204. The thin film is an elliptical light diffusing film with a microstructure surface. When parallel light shines onto the microstructure surface, the light is diffused providing an appearance of a single linear lighting source instead of the plurality of LEDs. The microstructure of the thin film enables unidirectional diffusion and when the height of the reflective cavity is high enough, or the LED spacing is close enough, the thin film 204 functions as a normal diffusion film. Each LED shines a conical area and, because of the proximity of the LEDs, most of the thin film surface is covered by multiple conical areas. FIG. 8 is an alternative embodiment of the thin film 204, in which one surface has wave form while other surface is flat.

Figure 6:
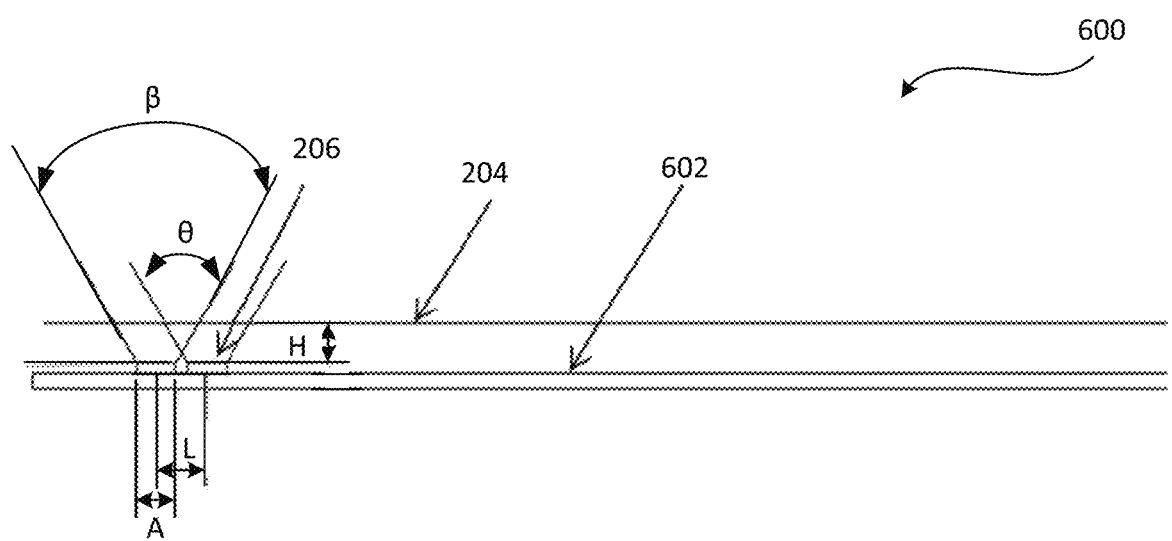
FIG. 6 is an illustration 600 of the relationship between the elements of the tubular LED lighting fixture.

The tubular LED light fixture of the present invention emits light uniformly along its length and without the appearance of having multiple light sources and this is accomplished by spacing the adjacent LEDs and placing the thin film at a special distance above the LEDs. FIG. 6 is an illustration 600 of the relationship between the elements of the tubular LED lighting fixture. Each LED has a length A (measured along the length of the tubular LED light fixture) and is separated at a distance L (measured between the center of the adjacent LEDs). The light emitted by a LED 206 forms generally an illumination cone β and two adjacent cones overlap. The overlapping cone has an angle θ. The thin film 204 is placed above the LEDs 206 at a distance H. The LEDs 206 are placed above the circuit board 602. The relationship between the elements is expressed according to equation below.

$$H \geq \tan\left(90 - \frac{\theta}{2}\right) * (0.9 + L - A)$$

The light-emitting surface of the plurality of LEDs should be narrower and its width should be similar to the length of the LED to maximize the scanning. Through the light distribution, the LED light-emitting area is enlarged, and a continuous light spot is formed on the surface of the lamp cover, that is, the dark area between the LED light-emitting points will disappear, and the light-emitting surface achieves a linear light source effect.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated. It is also understood that the features shown in different embodiments can be easily combined without departing from the spirit of the present invention.

The invention claimed is:

1. A tubular lighting device comprising:
a housing;
a lighting chassis mounted on the housing;
at least one circuit board with a plurality of LEDs mounted on the lighting chassis, each LED having a length A and two adjacent LEDs being separated by a distance L;
a thin film mounted on the base and above the plurality of LEDs, the thin film being separated from the plurality of LEDs by a distance H; and
a lens mounted on the lighting chassis and above the thin film,
wherein
light emitted from each LED passes through the thin film and forms an illumination cone,
two adjacent illumination cones defines an overlapping cone, and
the area of the thin film is covered by at least one overlapping cone except for two ends of the thin film.

2. The tubular light device of claim 1, wherein
the overlapping cone defines an overlapping angle θ, and
a relationship between the plurality of LEDs, the thin film, and the overlapping angle θ is defined by $$H \geq \tan\left(90 - \frac{\theta}{2}\right) * (0.9 + L - A)$$

Tan=tangent,
θ=overlapping angle, and θ≥10,
L=distance between centers of two adjacent LEDs,
A=length of each LED, and
H=distance between the LEDs and the thin film.

3. The tubular light device of claim 1, further comprising at least one reflector mounted on the lighting chassis for reflecting the light emitted by the plurality of LEDs.

4. The tubular light device of claim 1, further comprising at least one reflector mounted on the at least one circuit board.

5. The tubular light device of claim 1, wherein the lens is an asymmetric lens.

6. The tubular light device of claim 1, wherein the thin film is attached to the lens.

7. The tubular light device of claim 1, wherein the thin film is an elliptical light diffusing film with a microstructure surface.

8. The tubular light device of claim 1, further comprising a cover mounted on the housing.

9. The tubular light device of claim 1, wherein the housing further comprises at least on side wall and at least one hook disposed away from the at least one side wall, the cover further comprises at least one connecting skirt with a plurality of flanges, and the connecting skirt is inserted between the at least one side wall and the hook.

10. The tubular light device of claim 1, wherein there are two circuit boards, each with a plurality of LEDs, mounted on the lighting chassis.

11. The tubular light device of claim 10, wherein two circuit boards face away from each other.

* * * * *